(12) United States Patent
Khamis et al.

(10) Patent No.: US 11,891,083 B2
(45) Date of Patent: Feb. 6, 2024

(54) SYSTEM AND METHOD FOR VIRTUAL EXPERIENCE AS A SERVICE WITH CONTEXT-BASED ADAPTIVE CONTROL

(71) Applicant: GM GLOBAL TECHNOLOGY OPERATIONS LLC, Detroit, MI (US)

(72) Inventors: Alaa M. Khamis, Courtice (CA); Neeraj R. Gautama, Whitby (CA); Jarvis Chau, Markham (CA); Jomo Hanley, Bowmanville (CA); Kelley J. Kettenbeil, Milford, MI (US); Gina E. Griffith, Shelby Township, MI (US); Scott E. Jackson, Northville, MI (US); Ian Gibbs, Bloomfield Hills, MI (US); Mark T. Gaylord, Lake Orion, MI (US); Maria Alejandra Gonzalez, Birmingham, MI (US); Nicholis Festa, Novi, MI (US); Nathan Robinson, South Lyon, MI (US); Ute Winter, Petach Tikva (IL); Sachin Raviram, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 309 days.

(21) Appl. No.: 17/544,066

(22) Filed: Dec. 7, 2021

(65) Prior Publication Data
US 2023/0174089 A1    Jun. 8, 2023

(51) Int. Cl.
*B60W 50/14*    (2020.01)
*H04W 4/46*    (2018.01)
*B60W 50/10*    (2012.01)
*G06V 40/16*    (2022.01)
*G06V 20/59*    (2022.01)

(52) U.S. Cl.
CPC ............ *B60W 50/14* (2013.01); *B60W 50/10* (2013.01); *G06V 20/597* (2022.01); *G06V 40/174* (2022.01); *H04W 4/46* (2018.02); *B60W 2050/146* (2013.01)

(58) Field of Classification Search
CPC ........ B60W 50/14; B60W 50/10; H04W 4/46; G06V 20/59; G06V 40/16
See application file for complete search history.

(56) References Cited

U.S. PATENT DOCUMENTS

| | | | |
|---|---|---|---|
| 2010/0131865 A1* | 5/2010 | Ackley | G06F 3/011 715/757 |
| 2017/0052666 A1* | 2/2017 | Wang | B60K 37/06 |
| 2021/0346805 A1* | 11/2021 | Daniali | A63F 13/332 |

* cited by examiner

*Primary Examiner* — Tan Q Nguyen
(74) *Attorney, Agent, or Firm* — Quinn IP Law (57) ABSTRACT

A system for context-based adaptive virtual experience control in a vehicle is provided. The system includes an output device configured for providing a sensory output to a user of the vehicle and a computerized virtual experience control module configured for controlling the output device based upon a virtual experience mode. The system further includes a computerized context-based adaptive control module configured for monitoring contextual data related to one of the user of the vehicle or operation of the vehicle, monitoring feedback from the user related to one of favor or disfavor related to the virtual experience mode, and utilizing the contextual data and the feedback from the user to selectively, automatically command activation of the virtual experience mode.

20 Claims, 8 Drawing Sheets

SYSTEM AND METHOD FOR VIRTUAL EXPERIENCE AS A SERVICE WITH CONTEXT-BASED ADAPTIVE CONTROL

INTRODUCTION

The disclosure generally relates to a system and method for virtual experience as a service with context-based adaptive control.

Motor vehicles may include input and output devices useful to enable a driver and/or passenger in the vehicle to interact with the vehicle. A vehicle may include a touchscreen device useful to display information to the driver upon the touchscreen and receive touch inputs to the same touchscreen. A vehicle may have an additional display screen useful to provide information and/or entertainment to passengers in the vehicle, such as a head-up display and a back seat display screen. A vehicle may have interior lights and/or exterior lights that may include a selectable or controllable color. A vehicle may have an audio system including speakers that may provide audible sounds to the driver and passengers of the vehicle. A vehicle may have a haptic system and massage seats that may provide haptic feedback, comfort massage and anti-fatigue massage. A vehicle may be operable to control additional systems by computerized command, such as a climate control system including a blower and temperature control unit; a vehicle horn; automatic window, sunroof, and convertible top controls; steering wheel tilt and telescopic controls; and seat position, tilt, massage mode and thermal controls. The vehicle may be further operable to control additional systems, including vehicle suspension controls, for example, operable to adjust a height, tilt, and ride setting for the vehicle; engine tuning controls, for example, operable to select between a normal setting and a sport setting; steering controls, for example, operable to select between a normal steering mode and a sport steering mode; and a navigation system, including a three-dimensional digital map database and programming to select and adjust a planned travel route for the vehicle. The vehicle may further be configured as an autonomous vehicle, including programming to automatically operate the vehicle including travel through a planned travel route for the vehicle.

Graphic designs and display themes may be displayed upon a touchscreen device or other display screen in a vehicle. In one example, a logo for the manufacturer of the vehicle may be displayed upon a display screen when the vehicle is started. Computerized programming may be used to provide infotainment graphics upon a display screen.

Haptic feedback mechanisms may be utilized in a vehicle. A steering wheel, a seating surface, or other similar surfaces in a vehicle may be equipped with a vibrating mechanism to selectively provide a vibratory output that may be perceptible by the driver or passengers.

SUMMARY

A system for virtual experience as a service with context-based adaptive control in a vehicle is provided. The system includes an output device configured for providing a sensory output to a user of the vehicle and a computerized virtual experience control module configured for controlling the output device based upon a virtual experience mode. The system further includes a computerized context-based adaptive control module configured for monitoring contextual data related to one of the user of the vehicle or operation of the vehicle, monitoring feedback from the user related to one of favor or disfavor related to the virtual experience mode, and utilizing the contextual data and the feedback from the user to selectively, automatically command activation of the virtual experience mode.

In some embodiments, the computerized context-based adaptive control module configured for monitoring the feedback from the user may include the computerized context-based adaptive control module being configured for one of monitoring user inputs, monitoring activation of a manual control override changing operation of the virtual experience mode, or monitoring a frequency of the activation of the manual control override. The computerized context-based adaptive control module configured for monitoring the feedback from the user may alternatively include the computerized context-based adaptive control module being configured for one of monitoring a time elapsed between an initiation of the virtual experience mode and the activation of the manual control override, monitoring inputs to a microphone device related to operation of the virtual experience mode, or monitoring facial expressions of the user.

In some embodiments, the system further includes a computerized quality of experience module configured for monitoring the feedback from the user and generating a feedback reward value including a discreet, scalar value based upon the monitored feedback. The computerized context-based adaptive control module configured for monitoring the feedback from the user includes the computerized context-based adaptive control module being configured for monitoring the feedback reward value.

In some embodiments, the computerized context-based adaptive control module configured for utilizing the contextual data and the feedback from the user to selectively, automatically command activation of the virtual experience mode includes the computerized context-based adaptive control module being configured for utilizing a learning algorithm to update the commanded activation.

In some embodiments, the computerized context-based adaptive control module is further configured for utilizing the monitored feedback and the contextual data to generate contextualized feedback. The computerized context-based adaptive control module configured for utilizing the learning algorithm to update the commanded activation includes the computerized context-based adaptive control module being configured for updating the learning algorithm based upon the contextualized feedback.

In some embodiments, the computerized context-based adaptive control module configured for utilizing the learning algorithm includes the computerized context-based adaptive control module being configured for learning an optimal state-virtual experience activation policy.

In some embodiments, the computerized context-based adaptive control module configured for utilizing the learning algorithm includes the computerized context-based adaptive control module being configured for utilizing an asynchronous advantage actor-critic algorithm.

In some embodiments, the computerized context-based adaptive control module configured for utilizing the contextual data and the feedback from the user to selectively, automatically command activation of the virtual experience mode includes the computerized context-based adaptive control module being configured for referencing a look-up table.

In some embodiments, the computerized context-based adaptive control module configured for monitoring the contextual data includes the computerized context-based adaptive control module being configured for monitoring one of an identity of the user, an identity of a passenger in the vehicle, or an identity of a driver of another vehicle.

In some embodiments, the computerized context-based adaptive control module configured for monitoring the contextual data includes the computerized context-based adaptive control module being configured for monitoring one of an emotional state of the user, a distraction level of the user, a fatigue level of the user, a drowsiness level of the user, a weather condition, a road condition, or a vehicle condition.

In some embodiments, the computerized context-based adaptive control module configured for monitoring the contextual data includes the computerized context-based adaptive control module being configured for monitoring one of a time of day, occurrence of a threshold social event, occurrence of a threshold sporting event, or occurrence of a vehicle anomaly event.

In some embodiments, the computerized context-based adaptive control module configured for monitoring the contextual data includes the computerized context-based adaptive control module being configured for monitoring one of a user proximity to the vehicle, a proximity of the vehicle to a home location, a proximity of the vehicle to a workplace location, a proximity of the vehicle to a landmark, or a geographic location of the vehicle.

In some embodiments, the system further includes a remote computerized server device including a virtual experience infrastructure system configured for receiving and publishing new virtual experience modes.

In some embodiments, the system further includes a remote computerized server device including a distributed ledger-based system configured for employing blockchain methodology.

In some embodiments, the system further includes a remote computerized server device including a virtual experience orchestration module enabling a common virtual experience within a plurality of vehicles.

According to one alternative embodiment, a system for virtual experience as a service with context-based adaptive control in a vehicle is provided. The system includes an output device configured for providing a sensory output to a user of the vehicle and a computerized virtual experience control module configured for controlling the output device based upon a virtual experience mode. The system further includes a computerized context-based adaptive control module configured for monitoring contextual data related to one of the user of the vehicle or operation of the vehicle, monitoring feedback from the user related to one of favor or disfavor related to the virtual experience mode, and utilizing the contextual data and the feedback from the user to selectively, automatically command activation of the virtual experience mode. The system further includes a computerized quality of experience module configured for monitoring the feedback from the user and generating a feedback reward value including a discreet, scalar value based upon the monitored feedback. The computerized quality of experience module configured for monitoring the feedback from the user may include the computerized quality of experience module being configured for one of monitoring user inputs, monitoring activation of a manual control override changing operation of the virtual experience mode, or monitoring a frequency of the activation of the manual control override. The computerized quality of experience module configured for monitoring the feedback from the user may alternatively include the computerized quality of experience module being configured for one of monitoring a time elapsed between an initiation of the virtual experience mode and the activation of the manual control override, monitoring inputs to a microphone device related to operation of the virtual experience mode, or monitoring facial expressions of the user. The computerized context-based adaptive control module configured for monitoring the feedback from the user includes the computerized context-based adaptive control module being configured for monitoring the feedback reward value. The computerized context-based adaptive control module configured for utilizing the contextual data and the feedback from the user to selectively, automatically command activation of the virtual experience mode includes the computerized context-based adaptive control module being configured for utilizing a learning algorithm to update the commanded activation.

According to one alternative embodiment, a method for context-based adaptive virtual experience control in a vehicle is provided. The method includes operating an output device configured for providing a sensory output to a user of the vehicle and, within a computerized virtual experience control module, controlling the output device based upon a virtual experience mode. The method further includes, within a computerized context-based adaptive control module, monitoring contextual data related to one of the user of the vehicle or operation of the vehicle, monitoring feedback from the user related to one of favor or disfavor related to the virtual experience mode, and utilizing the contextual data and the feedback from the user to selectively, automatically command activation of the virtual experience mode.

In some embodiments, monitoring the feedback from the user may include one of monitoring user inputs, monitoring activation of a manual control override changing operation of the virtual experience mode, or monitoring a frequency of the activation of the manual control override. Monitoring the feedback from the user may alternatively include one of monitoring a time elapsed between an initiation of the virtual experience mode and the activation of the manual control override, monitoring inputs to a microphone device related to operation of the virtual experience mode, or monitoring facial expressions of the user.

In some embodiments, utilizing the contextual data and the feedback from the user to selectively, automatically command activation of the virtual experience mode includes utilizing a learning algorithm to update the commanded activation.

In some embodiments, monitoring the contextual data includes monitoring one of an identity of the user, an identity of a passenger in the vehicle, or an identity of a driver of another vehicle.

The above features and advantages and other features and advantages of the present disclosure are readily apparent from the following detailed description of the best modes for carrying out the disclosure when taken in connection with the accompanying drawings.

DETAILED DESCRIPTION

A system and method for virtual experience as a service with context-based adaptive control is provided. A virtual experience as a service includes a coordinated theme provided to a user in a vehicle, with multiple outputs being provided to the user in accordance with the coordinated theme. Themes are comprised of elements based on vehicle capability such as screens, interior lighting, interior sounds, aromas and/or choreography. The virtual experience may be updatable, may be upgradable, and may be customized according to preferences of the user of the vehicle.

The virtual experience program may include different themes. For example, a theme may be utilized emulating a particular sporting event or particular professional sports team. In another example, a theme related to a particular professional basketball team may be utilized. A logo for the team may be splashed upon a touchscreen device visible to the user, and sounds from a pre-game ceremony for the basketball team may be made audible over vehicle sound system. Sounds of a basketball being dribbled may be played over the vehicle sound system, and haptic vibrations may be created in the user's seat surface coordinated with the sound of the ball being dribbled. A burst of air or a change in set point temperature may be commanded of the vehicle climate control system in coordination with elements of the theme. Internal and external lights of the vehicle may be controlled to provide lighting coordinated with colors from the team logo or colors upon the team jersey. Operation of the theme may be coordinated with a planned travel route. For example, at a start of the route, a visual representation of a coach for the team and an audio recording of an inspirational phrase associated with the coach may be played. At a point in the planned travel route, when the vehicle is about to accelerate on a freeway on-ramp, a member of the basketball team may be audibly heard to say a phrase, such as "It's go time!" and a visual output upon the display screen may show a player of the team racing past a competitor to the basket. Operation of the theme may be reactive to conditions sensed by vehicle sensors during travel, for example, in response to the vehicle having to stop for a traffic jam, the vehicle audio system may play sounds of a crowd booing in reaction to a referee calling penalty, with a corresponding image being splashed upon the display screen and haptic outputs being generated to match the sounds of the crowd.

Operation of the virtual experience program may further include computerized control over external audio speakers, glass that may selectively change a tint level, activation of all wheel drive, and communication with a device monitoring heartrate or other readings related to a user in the vehicle.

In another example, a theme may be utilized emulating a particular movie or popular media program, for example, a popular space battle movie genre. As a user opens a door of the vehicle, a sound from the movie of a spaceship's door opening may be played upon the vehicle audio system. Stark black and white imagery matching themes from the movie may be illustrated upon the display screen and projected with internal and external lights of the vehicle. As the vehicle is started, a foreboding song associated with a villain in the movie may be played along with a quote by the villain. Haptic outputs may be generated along with visual splashes upon the display screen to imitate the vehicle being involved in a space battle. Accelerator pedal position may be utilized to indicate a desire by a driver of the vehicle to accelerate quickly, to which the theme may respond by playing audio from the movie of a character declaring "It's time to go to superspeed!" and displaying a corresponding graphic of a spaceship accelerating quickly upon the display screen. Sensed locations and trajectories of other vehicles close to the vehicle operating the theme or the host vehicle may be utilized to create sounds, graphic splashes upon the display screen, and haptic outputs emulating experiences from the movie. For example, a vehicle traveling in an opposite direction coming close to the host vehicle may cause the theme to activate a sound emulating a passing small fighter craft from the movie and output a corresponding brief haptic output coordinate with the sound. A large truck or similar larger vehicle travelling in a same direction as the host vehicle may cause the theme to activate a deep rumbling sound and persistent vibratory haptic output emulating persistent proximity to a large spaceship from the movie. The themes provided are exemplary, a number of alternative themes are envisioned, and the disclosure is not intended to be limited to the examples provided.

Themes utilized in the virtual experience may be programmed or be updatable by a manufacturer of the vehicle, for example, being configured specifically for the model of vehicle. A luxury vehicle may include a selectable set of pre-programmed themes intended to focus upon the quality and expensive taste emulated in the design of the vehicle. A sporty vehicle may include a selectable set of pre-programmed themes intended to focus upon the high performance of the vehicle and the power of the propulsion system of the vehicle. A family vehicle with seating for seven occupants may include pre-programmed selectable family themes, enabling a user to select themes configured for young children when children are present and more mature interests such as current events or favorite nature sounds when the children are not present.

Themes utilized in the virtual experience as a service may be downloadable or made accessible through a third-party database or subscription service. For example, a basketball team or a movie studio may officially publish themes, for example, making use of trademarks and copyrights owned or licensed by the entity. A radio station may publish a theme to play portions of popular songs, display graphic splashes upon the display screen, control internal lights corresponding to the beats of the music being played, and generate haptic outputs corresponding to the music. Themes may be created and published based upon special events, for example, with ticket holders on the way to a season-ending football game may be provided with a code to download a theme related to the event, and a planned travel route to the event may be utilized to unlock or activate certain portions of the programmed theme. Themes may be open sourced or made available to the public to publish. Themes may be moderated or subject to approval, for example, by the vehicle manufacturer, to ensure that the vehicle equipment is being used in a proper manner and that guidelines regarding driver distractions are being followed.

The presently disclosed system and method enable auto-activation of the virtual experience available in the host vehicle's virtual experience local repository based on contextual information. Context can be any information that characterizes the situation such as who (e.g., driver, passengers, other vehicle drivers), what (e.g., driver's emotional state, distracted, fatigue, drowsiness, weather condition, road condition, vehicle conditions), when (time of the day, date of social/sport events, vehicle anomaly events like flat tire, low battery, oil change request, loss of connectivity, etc.) and where to activate the virtual experience (user proximity, house proximity, workplace proximity, other vehicle proximity, landmark proximity, specific geo location, etc.). Excellent mapping between the context and the virtual experience to be activated is created using active reinforcement learning approach driven by quantified quality of experience (QoX). QoX reflects the level of satisfaction of the user with the auto-activated virtual experience (like a great deal, like, neither like nor dislike, dislike, or dislike a great deal). QoX is quantified based on observing the time elapsed between suggested virtual experience and manual change event, frequency of manual changes and/or using user's sentiment (verbal/non-verbal feedback after the virtual experience activation). The quantified QoX is then used to update the reward function of the active learning/reinforcement learning module to learn the association/mapping policy between the context and the virtual experience instead of using a predefined rigid lookup table.

The system includes a context-based adaptive control module to enable the auto-activation of the virtual experience available in the vehicle's virtual experience local repo based on contextual information and user's feedback. Context can be any information that characterize the situation such as who (e.g., driver, passengers, other vehicle drivers), what (e.g., driver's emotional state, distracted, fatigue, drowsiness, weather condition, road condition, vehicle conditions), when (time of the day, date of social/sport events, vehicle anomaly events like flat tire, low battery, oil change request, loss of connectivity, etc.) and where to activate the virtual experience (user proximity, house proximity, workplace proximity, other vehicle proximity, landmark proximity, specific geo location, etc.).

The optimal mapping between the detected context and the virtual experience to be activated can be based on a pre-defined look-up table or based on active reinforcement learning process using quantified Quality of Experience (QoX) to update a reward function. QoX reflects the level of delight or annoyance of the user with the activated virtual experience in each context.

In one embodiment, the QoX may be quantified into five levels (Like a great deal, Like, Neither like nor dislike, Dislike, Dislike a great deal) using a classification model that uses as inputs a set of observations captured after activating the virtual experience. These observations include, but are not limited to, time elapsed between activating the suggested virtual experience and manual change event, frequency of manual changes and user's sentiment (verbal/non-verbal feedback after the virtual experience activation). Verbal feedback may include voice feedback, non-speech audio or voice emotions. Facial expressions are an example of a non-verbal feedback. The quantified QoX level is used to update the reward function of the reinforcement learning model to find the optimal mapping between the context and the virtual experience to be activated based on the experience captured from previous interaction sessions.

Temporal difference model-free on-policy learning algorithm such as Asynchronous Advantage Actor-Critic (A3C) can be used to learn the optimal pairing between the context and the virtual experience. In this algorithm two functions are used: one that maintains and updates a policy (the actor) and another that evaluates the current state (the critic).

Figure 1:
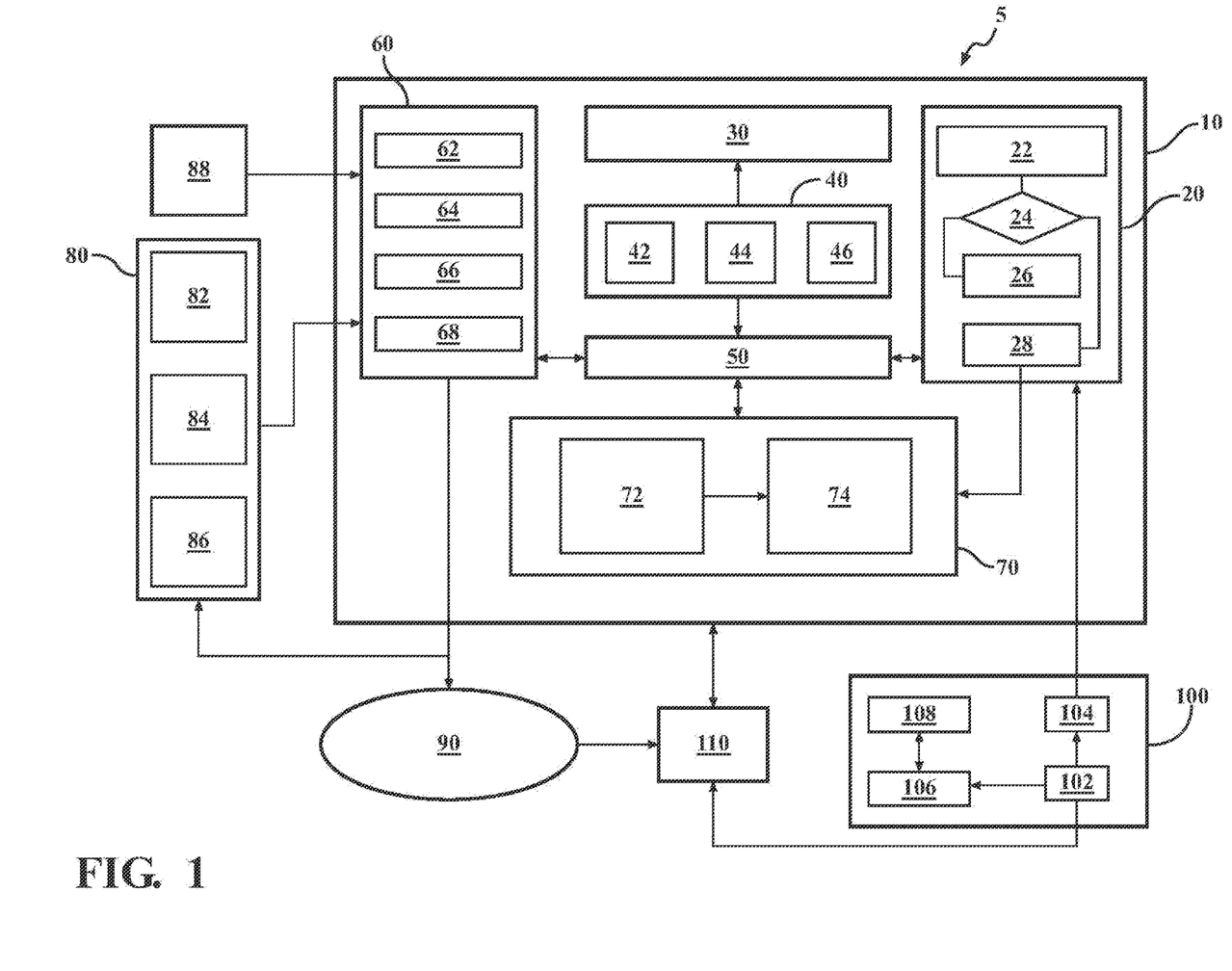
FIG. 1 schematically illustrates an exemplary virtual experience as a service infrastructure system operable to create, review, revise, and use alternative virtual experience modes in a vehicle, in accordance with the present disclosure.

Referring now to the drawings, wherein like reference numbers refer to like features throughout the several views, FIG. 1 schematically illustrates an exemplary virtual experience infrastructure system 5 operable to create, review, revise, and use alternative virtual experience programs in a vehicle. Infrastructure system 5 is illustrated including an online virtual experience store 10. The virtual experience store 10 includes programming operable on a remote device such as a computerized server device that is operable to receive virtual experience programs or modes from a plurality of sources, publish and store the virtual experience programs, and provide virtual experience programs to vehicles over a wireless communications network upon request. The virtual experience store 10 is illustrated including a virtual experience publication module 60, a store analytics engine 30, a real-time data collector 50, a virtual experience request handling module 20, and a virtual experience watchdog module 70.

The virtual experience publication module 60 includes programming to review and approve virtual experience programs that are received from one or more sources. The virtual experience publication module 60 includes a registration sub-module 62 operable to identify a source of an incoming virtual experience program and establish details such as a registration number for the incoming virtual experience program. The virtual experience publication module 60 further includes a risk analysis sub-module 64 operable to evaluate actions called for in customer vehicles within the incoming virtual experience programs and selectively approve the virtual experience programs for publication. A virtual experience program may be compared to limits and guidelines set by the vehicle manufacturer. In the event that a virtual experience program fails to meet the limits or guidelines, the risk analysis sub-module 64 may return the virtual experience program to the developer with a rationale for the rejection or may automatically adjust portions of the virtual experience program that fail to meet the limits or guidelines. Once approved, a virtual experience program is provided to the deployment and publication sub-module 66 which enables publication of the virtual experience program for downloading and use in customer vehicles. A royalty enrollment sub-module 68 enables payment of developers of a virtual experience program, for example, counting and initiating royalty commission payments based upon how many customer vehicles download a particular virtual experience program.

The real-time data collector 50 is a computerized module that acts as a librarian, categorizing and storing information from various sources in available storage mediums 40. In the exemplary embodiment of FIG. 1, three separate storage mediums are provided: virtual experience storage module 42, log data storage module 44 storing information such as a number of downloads for each virtual experience mode, and review storage module 46. Store analytics engine 30 is illustrated, accessing data from the virtual experience storage module 42, the log data storage module 44, and the review storage module 46 to perform programmed analyses upon the data. The store analytics engine 30 may perform various analyses upon the stored data, for example, evaluating which virtual experience modes are most popular for marketing purposes, evaluating themes of available virtual experience modes to encourage development of themes not already covered, and checking or flagging virtual experiences that receive a threshold negative number of poor reviews.

Published virtual experience modes are made available to a consuming public 90 which may rate and review the published virtual experience modes to a virtual experience mode review input 110. The reviews received by the virtual experience mode review input 110 may be provided to the virtual experience store 10 and the virtual experience watchdog module 70. The virtual experience watchdog module 70 includes a virtual experience diagnostics sub-module 72 and a virtual experience prognostics sub-module 74. The virtual experience watchdog module 70 and the virtual experience diagnostics sub-module 72 may include programming to classify and sort incoming reviews and may flag reviews that indicate malfunctioning virtual experience modes or virtual experience modes that produce an undesirable effect in the customer vehicles. Similarly, the virtual experience prognostics sub-module 74 may include programming to analyze reviews of virtual experience modes and predictively estimate factors such as threshold popular and threshold unpopular virtual experience modes.

A host vehicle 100 is illustrated in communication with the virtual experience store 10. The vehicle includes user inputs 102 enabling a user to interact with various elements of the host vehicle 100, the virtual experience store 10, and the virtual experience mode review input 110. The host vehicle 100 further includes a virtual experience store interaction module 104, which may include programming to access the virtual experience store 10, provide a list of available virtual experience modes to the user, and generate a download request to the virtual experience store 10 based upon inputs from the user. The host vehicle 100 further includes a virtual experience local repository 108 which may include a hard drive or similar computerized storage device useful to store one or more virtual experience modes. In one embodiment, a virtual experience mode is a block of data and computerized instructions that are provided to and saved within the host vehicle 100. In another embodiment, the virtual experience mode may be streamed or transmitted in real time to the host vehicle 100 from a remote server device, with the virtual experience local repository 108 saving a buffer of data from the stream so as to provide smooth, slightly delayed operation of the virtual experience mode. The host vehicle 100 further includes a computerized virtual experience controller operable to execute programmed operations and virtual experience modes to achieve desired effects within the host vehicle 100. Request made by the virtual experience store interaction module 104 may be received by the virtual experience request handling module 20. The virtual experience request handling module 20 may include a compatibility check sub-module 22 that checks whether the hardware and software of the host vehicle 100 are compatible with a requested virtual experience mode. Based upon an evaluation of whether the host vehicle 100 is compatible with the requested virtual experience mode, decision sub-module 24 directs either a recommended upgrade module 26 to interact with the host vehicle 100 to recommend upgrades useful to operate the requested virtual experience mode or a virtual experience activation sub-module 28 to direct downloading and activation of the requested virtual experience mode within the host vehicle 100.

FIG. 1 further illustrates a virtual experience developers group 80 including a first developer 82, a second developer 84, and a third developer 86, each of which may independently or collaboratively create virtual experience modes with themes useful to create unique experience within customer vehicles including host vehicle 100. Any of the developers 82, 84, and 86 may include programmers working for third-party companies employing subject matter to create virtual experience modes and related themes for use in consumer vehicles, and may include representatives of the sports teams, production studios, or other entities owning or licensing the subject matter of the themes being developed. Developer 88 may alternatively be employed or hired by a manufacturer of the host vehicle 100 to create a virtual experience mode for use with a specific brand or model of vehicle. The infrastructure system 5 is provided as an exemplary system for creating, publishing, and using virtual experience modes in customer vehicles. The disclosure is not intended to be limited to the examples provided.

Figure 2:
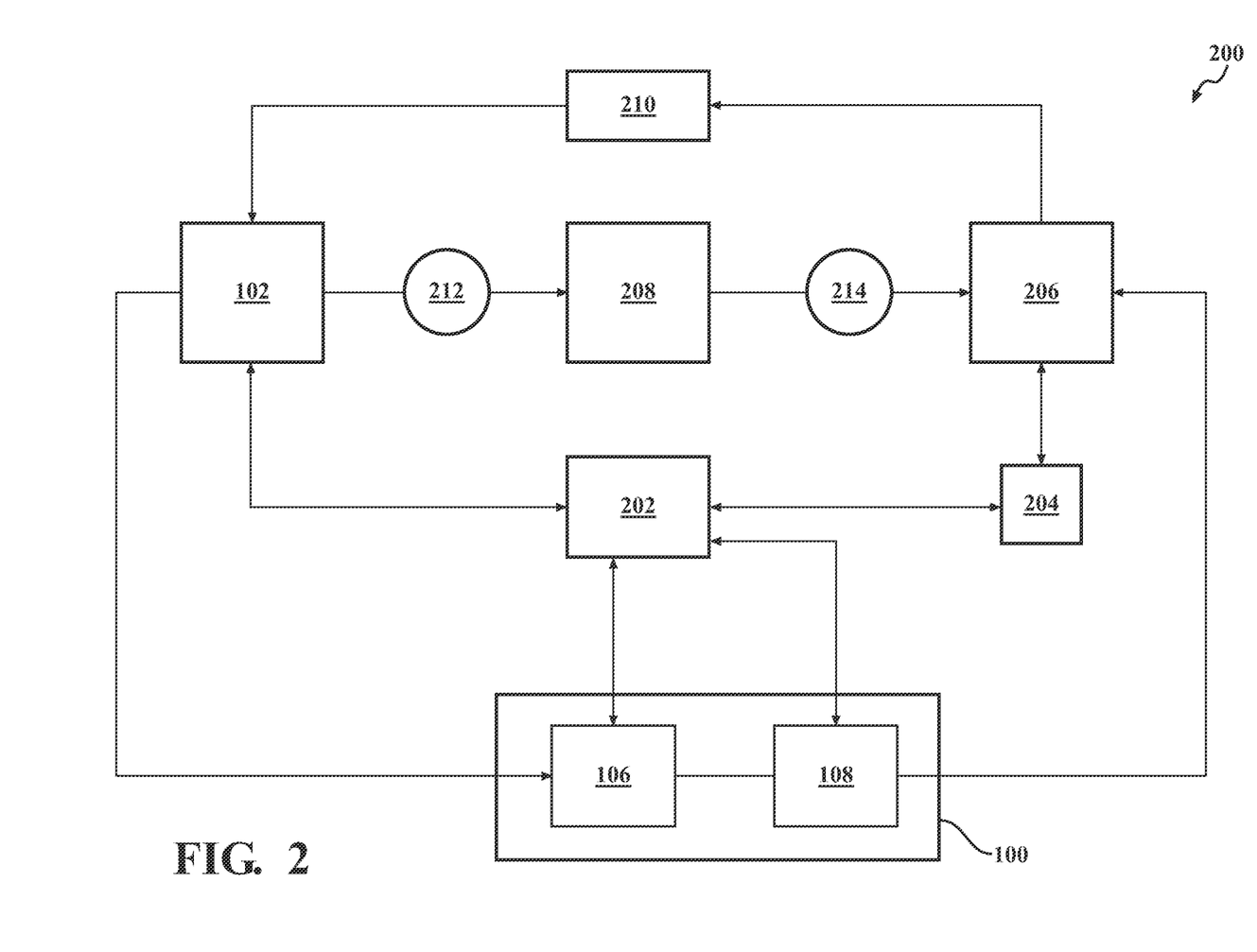
FIG. 2 schematically illustrates an exemplary distributed ledger-based system operable to distribute and provide payment for virtual experience programs, in accordance with the present disclosure.

In one embodiment, a distributed digital database utilizing a blockchain model may be utilized to distribute and provide payment for virtual experience modes. FIG. 2 schematically illustrates an exemplary distributed ledger-based system 200 operable to distribute and provide payment for virtual experience modes. The user inputs 102 are illustrated operable to receive inputs from a user, which may generate a virtual experience mode download request 212 to network 208. The user inputs 102 may be within and part of a host vehicle 100 or may alternatively be a separate device, such as a smartphone device. The network 208 may include a peer-to-peer (P2P) network including a plurality of connected computers or nodes. The network 208 processes the request 212 and provides validation 214 of the request to a vehicle specification network 206. The vehicle specification network 206 checks data within the validation 214 with saved acceptance specifications stored for vehicles and determines whether the requested virtual experience mode may be properly operated by the host vehicle. If the vehicle specification network 206 cannot validate the virtual experience mode download request 212 for the host vehicle 100, data is provided to remedial module 210 which may provide feedback to the user input 102, for example, recommending upgrades to the host vehicle useful to operate the requested virtual experience mode. If the vehicle specification network 206 can validate the virtual experience mode download request 212 for the host vehicle 100, data is provided to a ledger block generation module 204. Blockchain 202 is provided, including a durable historical record of blocks of information. A ledger block may be generated by the ledger block generation module, which may include a record of payment for the requested virtual experience mode and a license record showing that the user of the host vehicle 100 has a right to use the requested virtual experience mode. The blockchain 202 provides a permanent and unalterable record showing the status of the requested virtual experience mode in relation to the user of the host vehicle 100.

In parallel to the virtual experience mode download request 212 being provided to the network 208, user inputs may be provided to the virtual experience control module 106 of the host vehicle 100 and the virtual experience local repository 108 of the host vehicle, for example, providing a command to access an online site to provide payment for and request download of the requested virtual experience mode. Based upon data in the blockchain 202, the payment and requested download may be processed or blocked. Further, information from the host vehicle 100 such as a virtual experience mode status may be provided to the vehicle specification network 206 as a digital asset, such that such information may be further relayed and stored in the blockchain 202. The distributed ledger-based system 200 is provided as an exemplary system for requesting, paying for, and permanently recording rights to virtual experience modes in customer vehicles. The disclosure is not intended to be limited to the examples provided.

Figure 3:
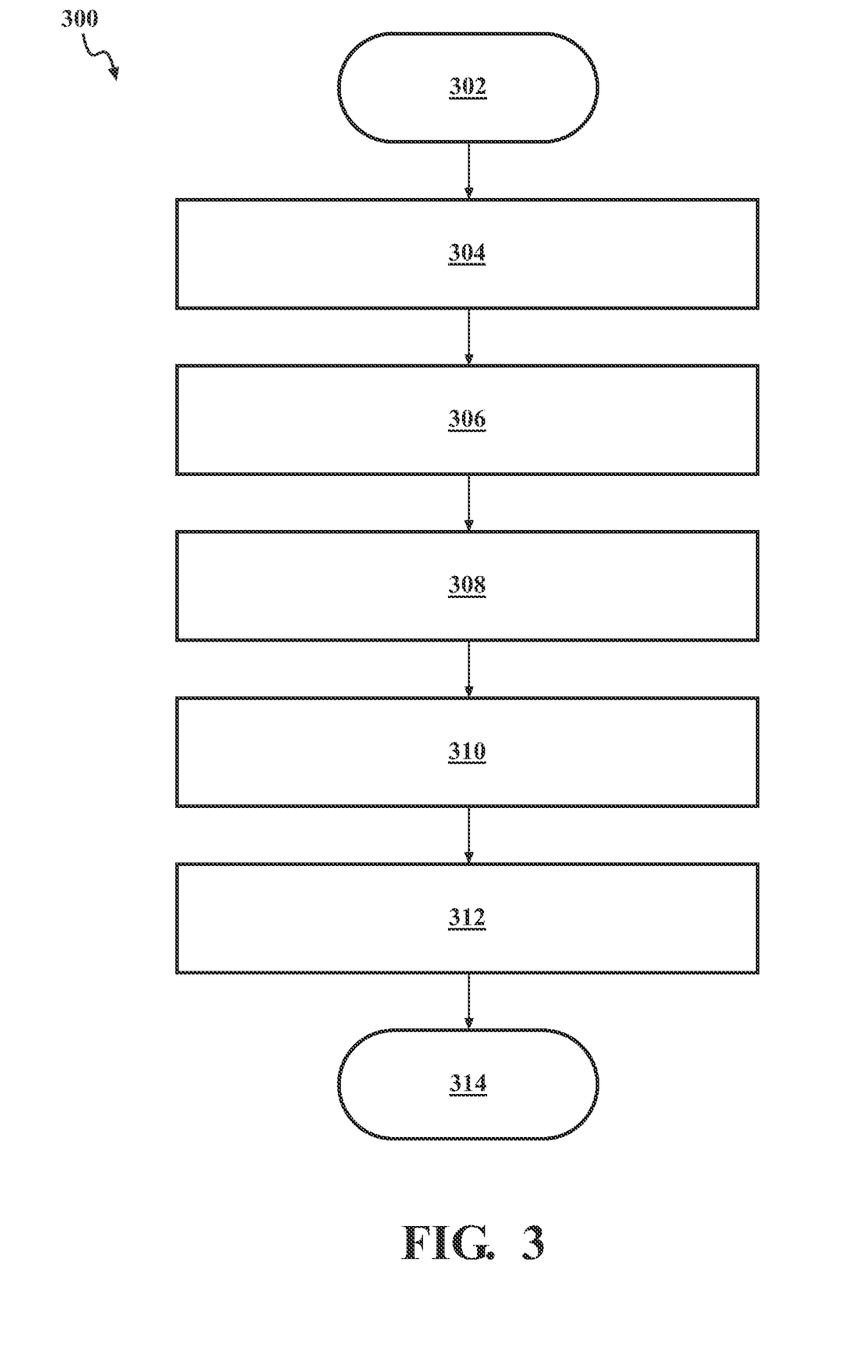
FIG. 3 is a flowchart illustrating an exemplary method to create and distribute a limited-edition virtual experience mode, in accordance with the present disclosure.

FIG. 3 is a flowchart illustrating an exemplary method 300 to create and distribute a limited-edition virtual experience mode. The method 300 starts at step 302. At step 304, a developer creates the limited-edition virtual experience mode. The limited-edition virtual experience mode may include a set number of copies of the limited-edition virtual experience mode, with a commitment or contract to not produce or release any additional copies in the future. In one embodiment, the set number of copies may be one. At step 306, a digital wallet or crypto wallet is created. Payment for a copy of the limited-edition virtual experience mode may be processed, for example, by Ethereum cryptocurrency, to pay fees associated with putting a non-fungible token (NFT) detailing ownership of the copy of the limited-edition virtual experience mode for sale. At step 308, the crypto wallet is connected to an NFT marketplace, where the sale of copy of the limited-edition virtual experience mode is authenticated. At step 310, the copy of the limited-edition virtual experience mode is digitally transferred and the record of the sale is minted in the associated NFT. At step 312, royalty payment to the developer of the special edition virtual experience mode may be released. At step 314, the method 300 ends.

Figure 4:
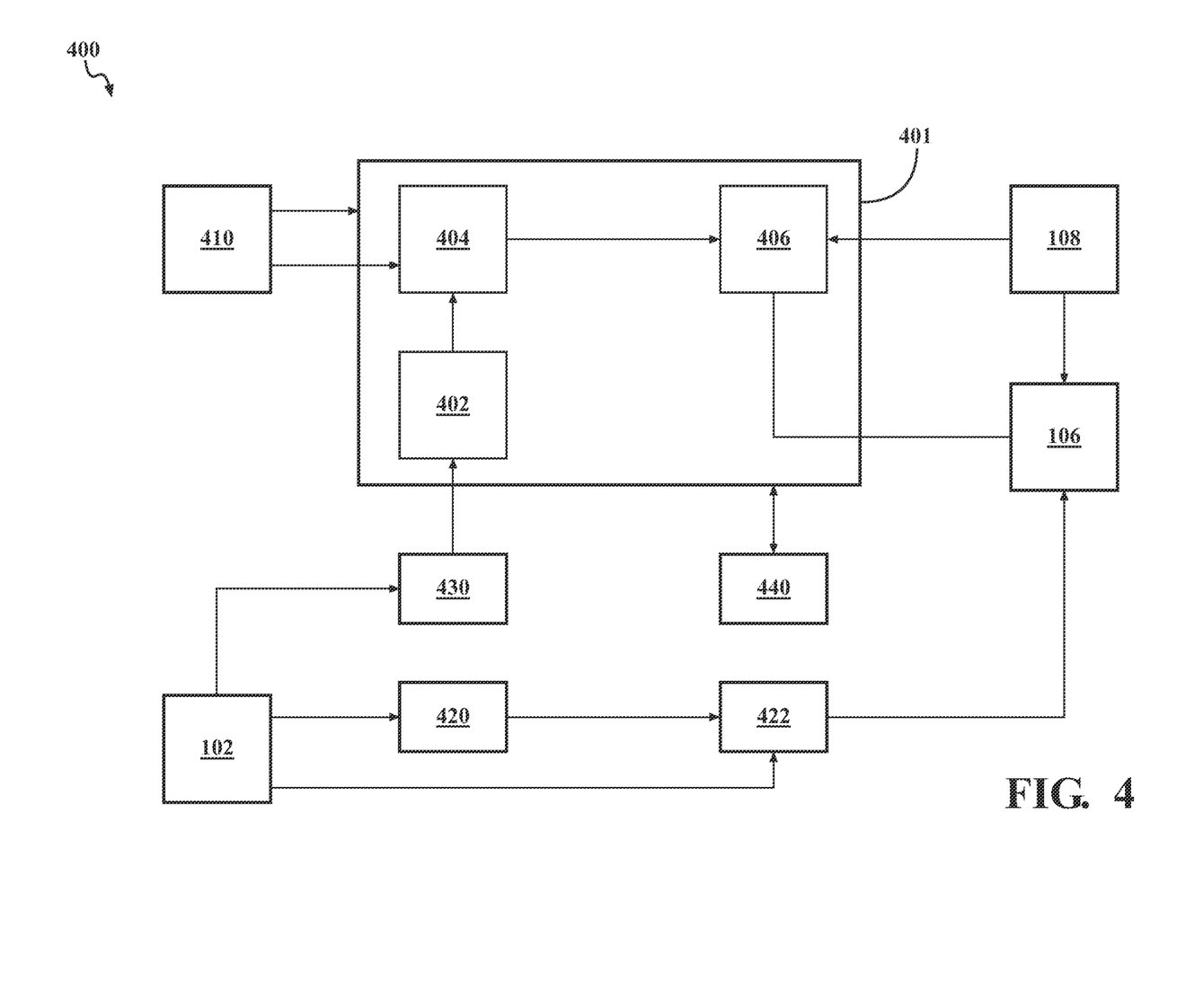
FIG. 4 illustrates an exemplary context-based adaptive auto-control controller operative to selectively control operation of a virtual experience mode or a portion of the virtual experience mode, in accordance with the present disclosure.

FIG. 4 illustrates an exemplary context-based adaptive auto-control controller 401 operative to selectively control operation of a virtual experience mode or portions thereof. A virtual experience context system 400 is illustrated including the context-based adaptive auto-control controller 401, a context provider/perception stack 410, and a quality of experience module 430. The context-based adaptive auto-control controller 401 is operable to evaluate and integrate behavioral patterns of a user of the host vehicle with contextual data to provide an excellent user experience related to the virtual experience modes. The context provider/perception stack 410 monitors and processes information related to a context of operation of the host vehicle. The information may include which user is presently in the vehicle, what passengers are in the vehicle, what is the behavior of the user and the passengers, what is the time of day, what is the current weather, what is the planned route of the vehicle, what is the context of the planned route (travel to/from work, travel to a sporting event, travel to a dentist office, travel to vacation destination), etc.

The quality of experience module 430 monitors direct and indirect indications by the user of the host vehicle to determine a feedback reward function for a virtual experience mode. For example, a user may activate the user input 102 to selectively activate, selectively turn-off, or provide a review of a currently operating virtual experience mode. Further, the user input may be utilized to either activate an auto-control override 420, utilized to change or deactivate portions of the virtual experience mode, or a manual control activation 422, utilized to give the user to directly control over operation of the virtual experience mode. Operation of the auto-control override 420 or the manual control activation 422 may be utilized to indicate favor or disfavor of the user to the auto-activation of virtual experience mode. A frequency of user overrides to the virtual experience mode may be utilized to determine favor or disfavor of the user. A time elapsed between initiation of the virtual experience mode and an input to override the virtual experience mode may be utilized to determine favor or disfavor of the user of the auto-activation of the virtual experience. A microphone may be utilized to determine favor or disfavor of the user based upon verbal feedback. The quality of experience module 430 may monitor and accumulate indications of favor and disfavor of the user to portions and/or aspects of the virtual experience mode and may provide a feedback reward value to the context-based adaptive auto-control controller 401. In one embodiment, the feedback reward value of the quality of experience module 430 may include a discrete scalar output including like a great deal (+1.0), like (+0.5), neither like or dislike (0.0), dislike (−0.5), and dislike a great deal (−1.0). A reward function update module 402 of the context-based adaptive auto-control controller 401 may accumulate or process the feedback reward value from the quality of experience module 430, providing a rating for portions of the virtual experience mode and for the virtual experience mode itself. An optimal state-virtual experience activation policy learning module 404 may combine the ratings provided by the reward function update module 402 with contextual information provided by the context provider/perception stack 410 to generate contextualized feedback data and determine context-based ratings for portions of the virtual experience mode and for the virtual experience mode itself. The optimal state-virtual experience policy learning module 404 provides a control policy to a virtual experience retrieval module 406 which may control operation, activation and deactivation, frequency of operation, and other factors related to the virtual experience mode. In one embodiment, the optimal state-virtual experience activation policy learning module 404 may utilize a machine learning algorithm to adjust weights to a factored control policy that provides for context-specific control of the virtual experience mode. In one embodiment, contextualized feedback is used to train the machine learning algorithm. In another embodiment, mapping between detected context and the virtual experience mode to be activated may be based on a pre-defined look-up table or based on active reinforcement learning process using quantified quality of experience to update a reward function. Quality of experience metrics or data reflects the level of delight or annoyance of the user with the activated virtual experience in each context.

The virtual experience retrieval module 406 may control or provide controlled operation of the virtual experience mode as it is accessed or retrieved from the virtual experience local repository 108 by the virtual experience control module 106. A manual control signal may additionally or alternatively modify or override the control policy within the virtual experience control module 106.

The context-based or context-specific control policy may utilize a number of different contextual inputs. For example, a plurality of users may utilize the same host vehicle. A first user may prefer quiet, nature based virtual experience modes and may prefer the virtual experience modes be activated on weekend days and deactivated on weekday days. A second user may prefer sports based virtual experience modes, in particular, after the user's favorite team wins a game.

However, when the second user's team loses a game, the user prefers to experience virtual experience modes based upon his/her favorite music performer. In another example, an internal camera and/or microphone may be utilized to observe the user and determine whether the user is in a good mood, an average mood, or a bad mood. The user's mood may be utilized as a context for weighting and then selecting the appropriate control policy.

The virtual experience context system 400 further includes a user profile/lookup table 440 providing storage of data and access to that data for the modules of the context-based adaptive auto-control controller 401.

Figure 5:
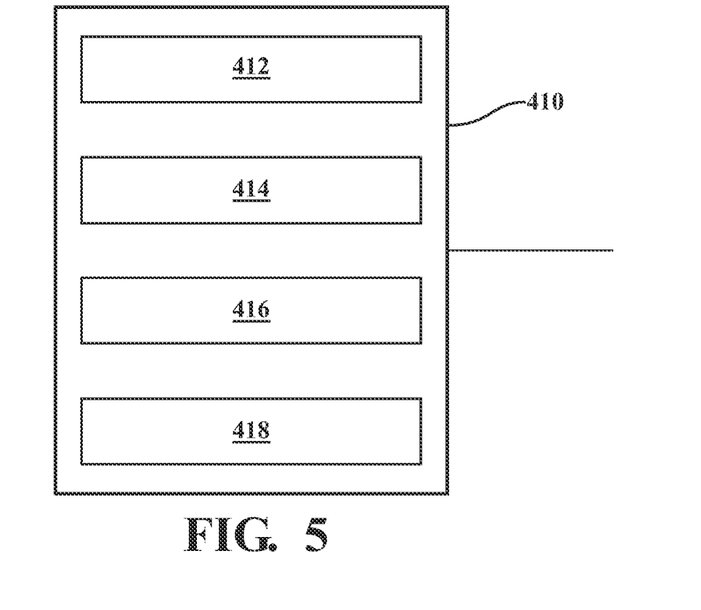
FIG. 5 schematically illustrates the context provider/perception stack of FIG. 4, in accordance with the present disclosure.

FIG. 5 schematically illustrates the context provider/perception stack 410 of FIG. 4. The context provider/perception stack 410 includes an identity context module 412, a situational context module 414, a temporal context module 416, and a spatial context module 418. The identify context module is in communication with and includes programming to monitor sensors operable to determine an identity of a user/driver and/or passengers of the vehicle. The sensors may include an internal and/or external camera device, a microphone device, a communications device in contact with user specific key fobs, weight and/or position sensors in car seats, or other similar sensors. The identity context module 412 may use sensor inputs to estimate an entity of a driver, of passengers, drivers of nearby vehicles, whether children are present in the vehicle, and whether pets are present in the vehicle.

The situational context module 414 is in communication with and includes programming to monitor sensors operable to determine situational context. The sensors may be used to estimate a state of the user (emotional state, distraction state, fatigue, drowsiness, etc.) The sensors may be used to estimate a weather condition (sunny, snowy, rainy, foggy, etc.), a road condition (traffic jam, unpaved roads, slippery road, etc.), or vehicle conditions (climate control settings, seat settings, battery state, etc.)

The temporal context module 416 is in communication with and includes programming to monitor sensors operable to determine a local time of day (clock, navigation system, etc.), occurrence of special events of interest to a user (access to the Internet, social networking information for the user, preferences entered by the user), and vehicle anomaly events such as a flat tire, low battery, oil change status, loss of communication connectivity, etc.

The spatial context module 418 is in communication with and includes programming to monitor sensors operable to determine where the user is located (within the vehicle, approaching the vehicle, scheduled to begin a planned travel route, etc.), where the user and the vehicle are located (proximity to home, proximity to a workplace, proximity of other vehicles, specific location in relation to special geographical or cultural locations, etc.) The context provider/perception stack 410 may process and provide data related to any of the modules operated therein to provide contextual information to the context-based adaptive auto-control controller 401 of FIG. 4.

Figure 6:
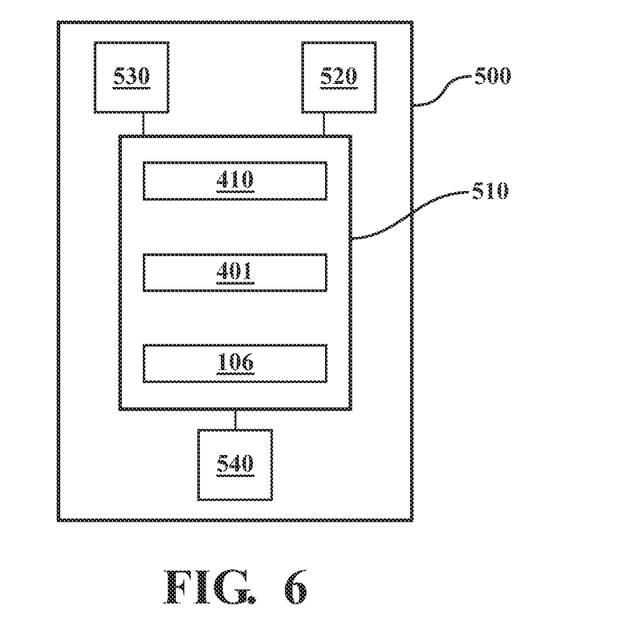
FIG. 6 schematically illustrates an exemplary computerized system controller, in accordance with the present disclosure.

The various computerized modules and control units disclosed herein may be operated within separate physical computerized devices, each including a computerized processor, random-access memory, and durable memory storage and including an operating system useful to enable operation of programming. In another embodiment some of the disclosed computerized modules and control units may be operated within a common system controller. FIG. 6 schematically illustrates an exemplary computerized system controller 500. Computerized system controller 500 includes processing device 510, communications device 520, data input output device 530, and memory storage device 540. It is noted that computerized system controller 500 may include other components and some of the components are not present in some embodiments.

The processing device 510 may include memory, e.g., read only memory (ROM) and random-access memory (RAM), storing processor-executable instructions and one or more processors that execute the processor-executable instructions. In embodiments where the processing device 510 includes two or more processors, the processors may operate in a parallel or distributed manner. Processing device 510 may execute the operating system of the computerized system controller 500. Processing device 510 may include one or more modules executing programmed code or computerized processes or methods including executable steps. Illustrated modules may include a single physical device or functionality spanning multiple physical devices. In the illustrative embodiment, the processing device 510 also includes the context provider/perception stack 410 of FIG. 5, the context-based adaptive auto-control controller 401 of FIG. 4, and the virtual experience control module 106 of FIG. 1.

The data input output device 530 is a device that is operable to take data gathered from sensors and devices throughout the vehicle and process the data into formats readily usable by processing device 510. Data input output device 530 is further operable to process output from processing device 510 and enable use of that output by other devices or control modules throughout the vehicle.

The communications device 520 may include a communications/data connection with a bus device configured to transfer data to different components of the system and may include one or more wireless transceivers for performing wireless communication.

The memory storage device 540 is a device that stores data generated or received by the computerized system controller 500. The memory storage device 540 may include, but is not limited to, a hard disc drive, an optical disc drive, and/or a flash memory drive. The memory storage device 540 may perform any of the data storage features and functions described herein.

The processing device 510 includes programming to operate each of the context provider/perception stack 410, the context-based adaptive auto-control controller 401, and the virtual experience control module 106.

Computerized system controller 500 is provided as an exemplary computerized device capable of executing programmed code to accomplish the methods and processes described herein. A number of different embodiments of computerized system controller 500, devices attached thereto, and modules operable therein are envisioned, and the disclosure is not intended to be limited to examples provided herein.

Figure 7:
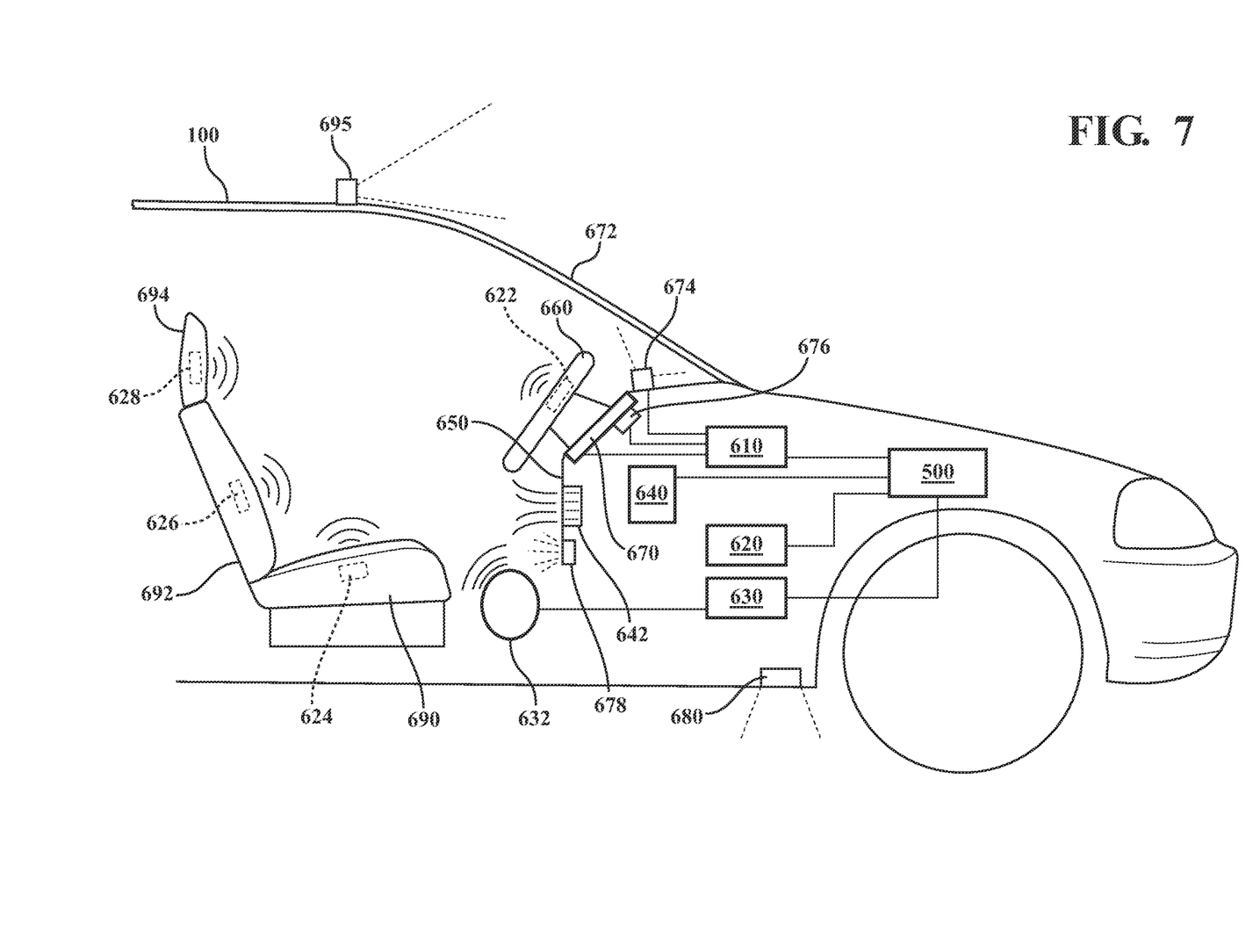
FIG. 7 schematically illustrates an exemplary host vehicle including the computerized system controller and various components within the vehicle useful to provide an experience associated with a virtual experience mode, in accordance with the present disclosure.

FIG. 7 schematically illustrates an exemplary host vehicle 100 including the computerized system controller 500 and various components within the vehicle useful to provide an experience associated with a virtual experience mode. The host vehicle 100 is illustrated including the computerized system controller 500, a steering wheel 660, a dash panel 650, a head-up display 672, a touchscreen device 670, and seat components 690, 692, and 694. The computerized system controller is illustrated communicably connected with a visual display controller 610, a haptic output controller 620, an audio system 630, and a climate control system 640. The computerized system controller 500 includes the context provider/perception stack 410, the context-based adaptive auto-control controller 401, and the virtual experience control module 106 as disclosed herein. In another embodiment, the context provider/perception stack 410, the context-based adaptive auto-control controller 401, and the virtual experience control module 106 may be shown individually as separate and interconnected units in place of the single computerized system controller 500 of FIG. 7.

The visual display controller 610 controls operation of the touchscreen device 670, a head-up display projector 674, an instrument panel graphics/lighting control unit 676, an internal light emitter 678, and an external light emitter 680. The visual display controller 610 may utilize commands and data provided by the computerized system controller 500 to provide coordinate light and graphic display effects as provided by the operating virtual experience mode.

The haptic output controller 620 controls operation of haptic output devices throughout the host vehicle 100. In the embodiment of FIG. 7, a haptic output device 622 is illustrated within the steering wheel 660, and haptic output devices 624, 626, and 628 are illustrated within the seating components 690, 692, and 694, respectively. The haptic output controller 620 may utilize commands and data provided by the computerized system controller 500 to provide coordinate haptic output effects as provided by the operating virtual experience mode.

The audio system 630 controls operation of audio output devices throughout the host vehicle 100. In the embodiment of FIG. 7, a speaker 632 is illustrated. Speakers may be located at various locations throughout the vehicle and may include a subwoofer device. The audio system 630 may utilize commands and data provided by the computerized system controller 500 to provide coordinate audio effects as provided by the operating virtual experience mode.

The climate control system 640 controls operation airflow and heating, ventilation, and air conditioning (HVAC) functions within the host vehicle 100. In the embodiment of FIG. 7, an HVAC vent 642 is illustrated. The audio system 630 may utilize commands and data provided by the computerized system controller 500 to provide coordinate airflow and temperature change effects as provided by the operating virtual experience mode.

Host vehicle 100 further includes external sensor device 695, which may include a camera device, a light detection and ranging (LIDAR) device, or other similar device useful to provide information to the host vehicle 100 of objects and road geometry in a driving environment of the host vehicle 100.

Figure 8:
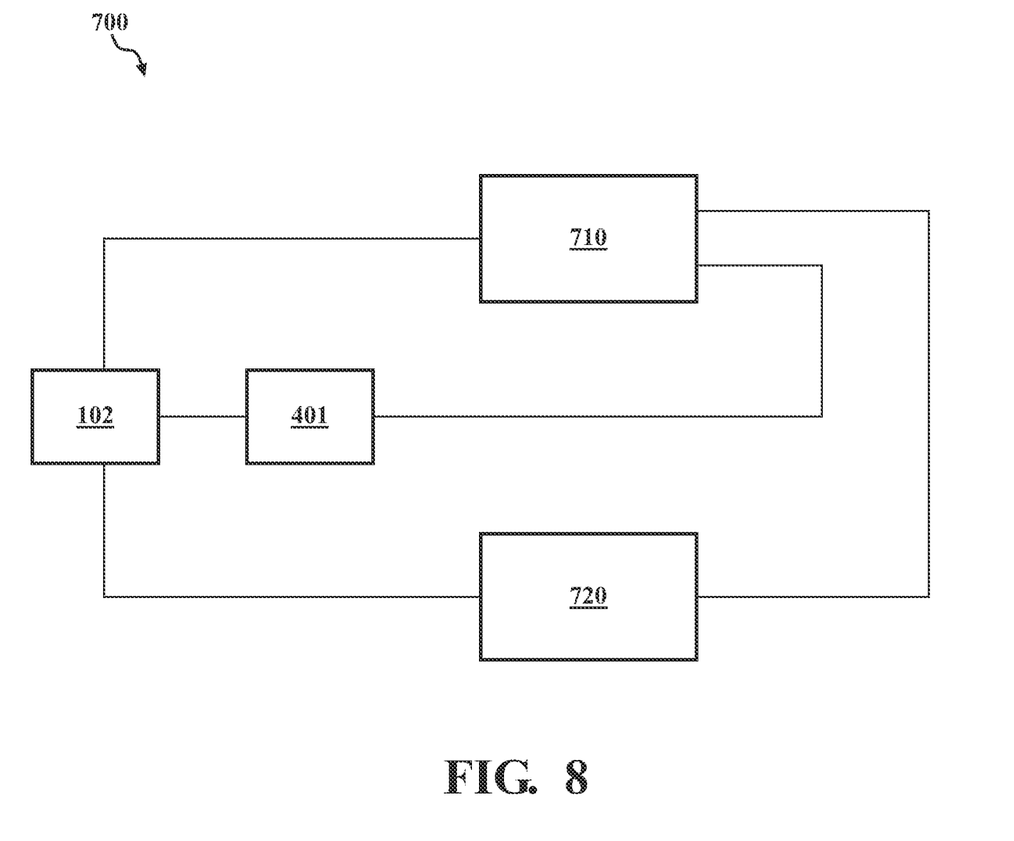
FIG. 8 schematically illustrates operation of an asynchronous advantage actor-critic system, in accordance with the present disclosure.

The context-based adaptive auto-control controller 401 combines contextual information with a feedback reward value describing favor or disfavor of the user for the virtual experience mode and/or portions thereof. Reinforcement learning-based agent is used to select the optimal state-virtual experience mode/program to be activated given the current state. In reinforcement learning, when a control agent activates a certain virtual experience mode/program given the current state, the state of the environment changes and the control agent gets the corresponding reward by monitoring and quantifying the quality of experience (QoX). The optimal policy is the policy that maximizes cumulative reward that the control agent gets based on the actions taken according to the policy from start till the final terminal state is reached in the episode. In one embodiment, an asynchronous advantage actor-critic system may be used as a temporal difference (TD) model-fee and on-policy learning algorithm. FIG. 8 schematically illustrates operation of an asynchronous advantage actor-critic system 700. Two functions are developed within the system 700: an actor function 710 and a critic function 720. The actor function 710 monitors contextual factors including an output from user inputs 102 and determines an updated control policy which is provided to context-based adaptive auto-control controller 401. In parallel, observations including an output from user inputs 102 are provided to and monitored by the critic function 720. The critic function 720 utilizes the observations to generate a value signal which is provided to the actor function 710 in order to update the actor function 710. The value signal is used to tell the actor how good each action is based on whether or not the resulting state is valuable.

Figure 9:
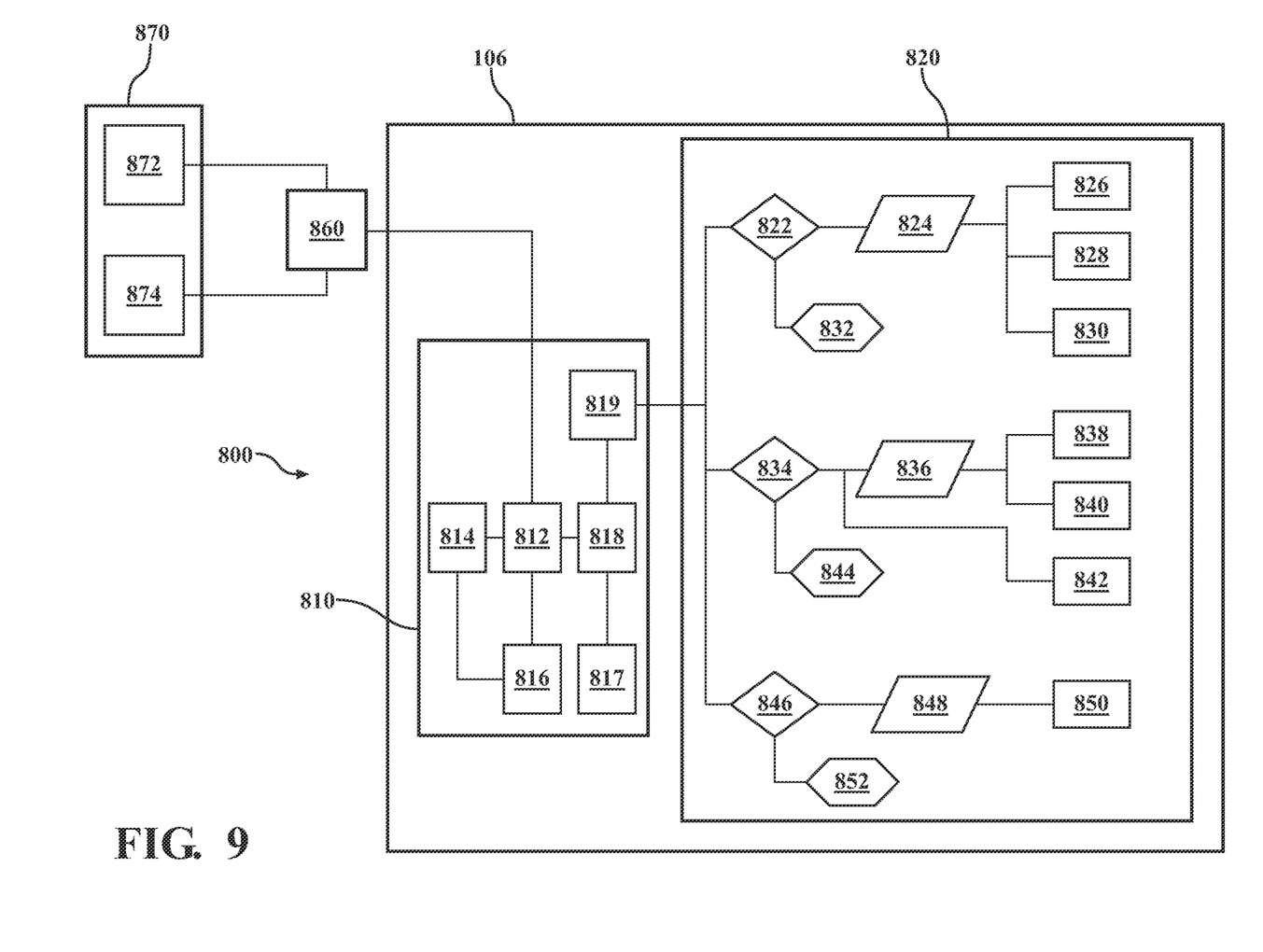
FIG. 9 schematically illustrates the virtual experience control module providing control over various vehicle systems in coordination with operating a virtual experience program, in accordance with the present disclosure.

FIG. 9 schematically illustrates the virtual experience control module 106 providing control over various vehicle systems in coordination with operating a virtual experience mode. The virtual experience control module 106 is illustrated including a virtual experience processing unit 810 and a resulting control logic 820. The virtual experience processing unit 810 is illustrated including a microprocessor 812, a memory storage device 814, a task scheduler 816, an input module 817, a vehicle communication transceiver 818 (providing communication through a controller area network (CAN) bus or an Ethernet), and an output module 819. The microcontroller includes a computerized processor operable to operate an operating system and execute programming. The memory storage device 814 includes a hard drive or other similar device operable to digitally store information and provide access to the information upon demand. The task scheduler 816 includes a device operable to instruct which computerized operations are to be performed in what sequence. The vehicle communication transceiver 818 provides communication between the microprocessor 812, the input module 817, and the output module 819. The input module 817 coordinates inputs, for example, provided by the user input 102 of FIG. 1. The output module 819 receives output instructions from the microprocessor 812 and provides control signals to carry out instructions generated by operation of the virtual experience mode.

The resulting control logic 820 illustrates control signals that are provided by the output module 819 to carry out instructions generated by operation of the virtual experience mode in various components and systems of the host vehicle. Decision block 822 determines whether an infotainment system is to be activated. If the system is to be activated, at step 824, an infotainment control module is activated. At steps 826, 828, and 830, commands, instructions, and/or data may be provided to a touchscreen display, a head-up display (HUD), and an audio system, respectively, based upon operation of the virtual experience mode. At block 832, if the infotainment system is not to be activated, the system waits and listens for a command to activate the infotainment system.

Decision block 834 determines whether a driver state is to be monitored. If the driver state is to be monitored, at step 836, a driver state monitoring module is accessed. If the driver state is to be monitored, at step 838, a driver monitoring system is operated including a camera device and a computerized processor operable to estimate driver context based upon images from the camera device. At step 840, an occupant monitoring system is operated including a microphone and seat sensors to determine details such as presence, location, and identity of occupants in the vehicle. At step 842, a wearable device sensor operable to monitor a heart rate and other information is operated. At block 844, if the driver state is not to be monitored, the system waits and listens for a command to monitor the driver state.

Decision block 846 determines whether interior lighting is to be controlled. If the interior lighting is to be controlled, at step 848, a body control module is activated. At step 850, interior lights are controlled based upon operation of the virtual experience mode. If the interior lighting is not to be controlled, at step 852, the system waits and listens for a command to control the interior lighting. A number of control logic and control signal variations are envisioned, the particular control signals illustrate within the resulting control logic 820 are provided as examples, and the disclosure is not intended to be limited to the examples provided.

Additionally, a vehicle telematics module 860 is illustrated. The vehicle telematics module 860 includes hardware and software to enable and facilitate wireless communication between vehicle systems including the virtual experience processing unit 810 and outside digital resources. The vehicle telematics module 860 and the virtual experience control module 106 may collectively be described as the virtual experience control system 800. In the embodiment of FIG. 9, the vehicle telematics module 860 is communication with a cloud module 870 representing digital databases and programming available to the vehicle through remote computerized servers. The cloud module 870 includes a virtual experience cloud server device. In one embodiment, the virtual experience cloud server device 872 may include the virtual experience infrastructure system 5 as is illustrated in FIG. 1. In another embodiment, the virtual experience cloud server device 872 may include the distributed ledger-based system 200 of FIG. 2 operable to employ blockchain methodology as disclosed herein.

The cloud module 870 is further illustrated including a virtual experience orchestration module 874 which may be utilized to coordinate the virtual experience activation and synchronization between the host vehicle and other multiple vehicles equipped with virtual experience modes or between the host vehicle and infrastructure. In one embodiment, three vehicles may be equipped with virtual experience processing units 810 operable to implement virtual experience modes. The orchestration module may enable these three vehicles to show a coordinated virtual experience such as a periodically alternating flag colors for the favorite sports team of each of the three drivers, enabling the three drivers to enjoy a group experience.

While the best modes for carrying out the disclosure have been described in detail, those familiar with the art to which this disclosure relates will recognize various alternative designs and embodiments for practicing the disclosure within the scope of the appended claims.

What is claimed is:

1. A system for virtual experience as a service with context-based adaptive control in a vehicle, comprising:
   an output device configured for providing a sensory output to a user of the vehicle;
   a computerized virtual experience control module configured for controlling the output device based upon a virtual experience mode; and
   a computerized context-based adaptive control module configured for:
   monitoring contextual data related to one of the user of the vehicle or operation of the vehicle;
   monitoring feedback from the user related to one of favor or disfavor related to the virtual experience mode; and
   utilizing the contextual data and the feedback from the user to selectively, automatically command activation of the virtual experience mode.

2. The system of claim 1, wherein the computerized context-based adaptive control module configured for monitoring the feedback from the user includes the computerized context-based adaptive control module being configured for one of monitoring user inputs, monitoring activation of a manual control override changing operation of the virtual experience mode, monitoring a frequency of the activation of the manual control override, monitoring a time elapsed between an initiation of the virtual experience mode and the activation of the manual control override, monitoring inputs to a microphone device related to operation of the virtual experience mode, or monitoring facial expressions of the user.

3. The system of claim 2, further comprising a computerized quality of experience module configured for:
   monitoring the feedback from the user; and
   generating a feedback reward value including a discreet, scalar value based upon the monitored feedback; and
   wherein the computerized context-based adaptive control module configured for monitoring the feedback from the user includes the computerized context-based adaptive control module being configured for monitoring the feedback reward value.

4. The system of claim 1, wherein the computerized context-based adaptive control module configured for utilizing the contextual data and the feedback from the user to selectively, automatically command activation of the virtual experience mode includes the computerized context-based adaptive control module being configured for utilizing a learning algorithm to update the commanded activation.

5. The system of claim 4, wherein the computerized context-based adaptive control module is further configured for utilizing the monitored feedback and the contextual data to generate contextualized feedback; and
   wherein the computerized context-based adaptive control module configured for utilizing the learning algorithm to update the commanded activation includes the computerized context-based adaptive control module being configured for updating the learning algorithm based upon the contextualized feedback.

6. The system of claim 5, wherein the computerized context-based adaptive control module configured for utilizing the learning algorithm includes the computerized context-based adaptive control module being configured for learning an optimal state-virtual experience activation policy.

7. The system of claim 5, wherein the computerized context-based adaptive control module configured for utilizing the learning algorithm includes the computerized context-based adaptive control module being configured for utilizing an asynchronous advantage actor-critic algorithm.

8. The system of claim 1, wherein the computerized context-based adaptive control module configured for utilizing the contextual data and the feedback from the user to selectively, automatically command activation of the virtual experience mode includes the computerized context-based adaptive control module being configured for referencing a look-up table.

9. The system of claim 1, wherein the computerized context-based adaptive control module configured for monitoring the contextual data includes the computerized context-based adaptive control module being configured for monitoring one of an identity of the user, an identity of a passenger in the vehicle, or an identity of a driver of another vehicle.

10. The system of claim 1, wherein the computerized context-based adaptive control module configured for monitoring the contextual data includes the computerized context-based adaptive control module being configured for monitoring one of an emotional state of the user, a distraction level of the user, a fatigue level of the user, a drowsiness level of the user, a weather condition, a road condition, or a vehicle condition.

11. The system of claim 1, wherein the computerized context-based adaptive control module configured for monitoring the contextual data includes the computerized context-based adaptive control module being configured for monitoring one of a time of day, occurrence of a threshold social event, occurrence of a threshold sporting event, or occurrence of a vehicle anomaly event.

12. The system of claim 1, wherein the computerized context-based adaptive control module configured for monitoring the contextual data includes the computerized context-based adaptive control module being configured for monitoring one of a user proximity to the vehicle, a proximity of the vehicle to a home location, a proximity of the vehicle to a workplace location, a proximity of the vehicle to a landmark, or a geographic location of the vehicle.

13. The system of claim 1, further comprising a remote computerized server device including a virtual experience infrastructure system configured for receiving and publishing new virtual experience modes.

14. The system of claim 1, further comprising a remote computerized server device including a distributed ledger-based system configured for employing blockchain methodology.

15. The system of claim 1, further comprising a remote computerized server device including a virtual experience orchestration module enabling a common virtual experience within a plurality of vehicles.

16. A system for virtual experience as a service with context-based adaptive control in a vehicle, comprising:
   an output device configured for providing a sensory output to a user of the vehicle;
   a computerized virtual experience control module configured for controlling the output device based upon a virtual experience mode; and
   a computerized context-based adaptive control module configured for:
      monitoring contextual data related to one of the user of the vehicle or operation of the vehicle;
      monitoring feedback from the user related to one of favor or disfavor related to the virtual experience mode; and
      utilizing the contextual data and the feedback from the user to selectively, automatically command activation of the virtual experience mode; and
   a computerized quality of experience module configured for:
      monitoring the feedback from the user; and
      generating a feedback reward value including a discreet, scalar value based upon the monitored feedback;
   wherein the computerized quality of experience module configured for monitoring the feedback from the user includes the computerized quality of experience module being configured for one of monitoring user inputs, monitoring activation of a manual control override changing operation of the virtual experience mode, monitoring a frequency of the activation of the manual control override, monitoring a time elapsed between an initiation of the virtual experience mode and the activation of the manual control override, monitoring inputs to a microphone device related to operation of the virtual experience mode, or monitoring facial expressions of the user;
   wherein the computerized context-based adaptive control module configured for monitoring the feedback from the user includes the computerized context-based adaptive control module being configured for monitoring the feedback reward value; and
   wherein the computerized context-based adaptive control module configured for utilizing the contextual data and the feedback from the user to selectively, automatically command activation of the virtual experience mode includes the computerized context-based adaptive control module being configured for utilizing a learning algorithm to update the commanded activation.

17. A method for context-based adaptive virtual experience control in a vehicle, comprising:
   operating an output device configured for providing a sensory output to a user of the vehicle;
   within a computerized virtual experience control module, controlling the output device based upon a virtual experience mode; and
   within a computerized context-based adaptive control module:
      monitoring contextual data related to one of the user of the vehicle or operation of the vehicle;
      monitoring feedback from the user related to one of favor or disfavor related to the virtual experience mode; and
      utilizing the contextual data and the feedback from the user to selectively, automatically command activation of the virtual experience mode.

18. The method of claim 17, wherein monitoring the feedback from the user includes one of monitoring user inputs, monitoring activation of a manual control override changing operation of the virtual experience mode, monitoring a frequency of the activation of the manual control override, monitoring a time elapsed between an initiation of the virtual experience mode and the activation of the manual control override, monitoring inputs to a microphone device related to operation of the virtual experience mode, or monitoring facial expressions of the user.

19. The method of claim 17, wherein utilizing the contextual data and the feedback from the user to selectively, automatically command activation of the virtual experience mode includes utilizing a learning algorithm to update the commanded activation.

20. The method of claim 17, wherein monitoring the contextual data includes monitoring one of an identity of the user, an identity of a passenger in the vehicle, or an identity of a driver of another vehicle.

* * * * *